(No Model.)  3 Sheets—Sheet 1.

L. DATHIS.
PORTABLE OVEN.

No. 292,544. Patented Jan. 29, 1884.

Witnesses
William J. Boulter
G. W. Knotts

Inventor
Leon Dathis
per Henry Orth
his atty (No Model.)  3 Sheets—Sheet 2.

L. DATHIS.
PORTABLE OVEN.

No. 292,544. Patented Jan. 29, 1884.

Witnesses
William J. Poulter
G. W. Knotts

Inventor
Léon Dathis
per Henry Ortts
his att'y.

(No Model.)
L. DATHIS.
PORTABLE OVEN.
No. 292,544.  Patented Jan. 29, 1884.
3 Sheets—Sheet 3.
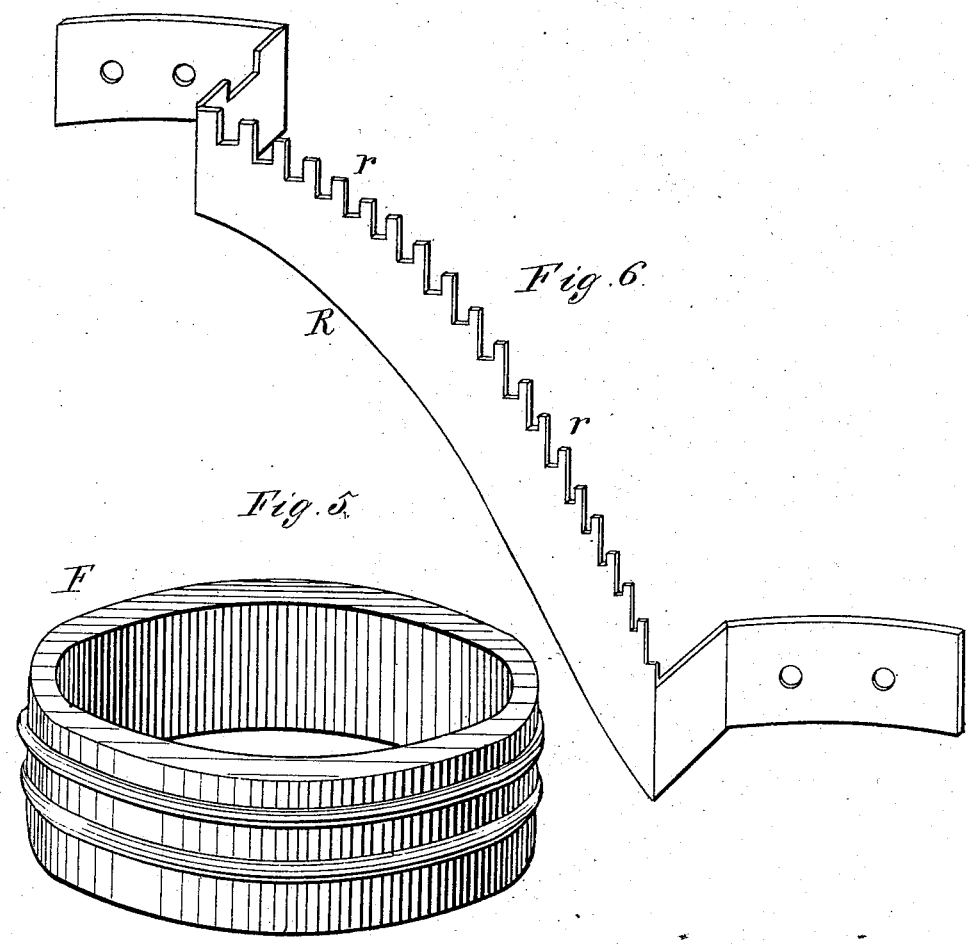

UNITED STATES PATENT OFFICE.

LEON DATHIS, OF PARIS, FRANCE.

PORTABLE OVEN.

SPECIFICATION forming part of Letters Patent No. 292,544, dated January 29, 1884.

Application filed January 10, 1883. (No model.) Patented in France January 31, 1882, No. 147,130; in Belgium February 5, 1883; in Germany January 5, 1883, and in Italy January 5, 1883.

*To all whom it may concern:*

Be it known that I, LEON DATHIS, a citizen of the French Republic, and a resident of Paris, France, have invented a certain new and useful Improvement in Portable Ovens; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention has for its object not only to more evenly distribute the heat over the interior area of the oven, but also to prevent loss of heat by radiation, and effect an economy in fuel.

The further object of my invention is to provide means whereby the oven-area may be enlarged or contracted, according to the quantity of material to be introduced, all as hereinafter fully described, and as shown in the annexed three sheets of drawings, in which—

Figure 1:
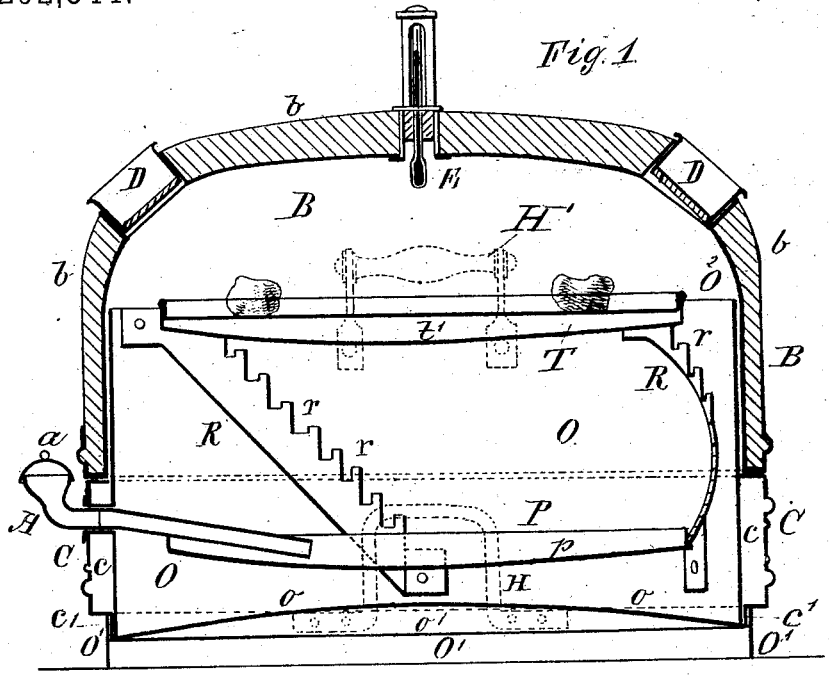
Figure 2:
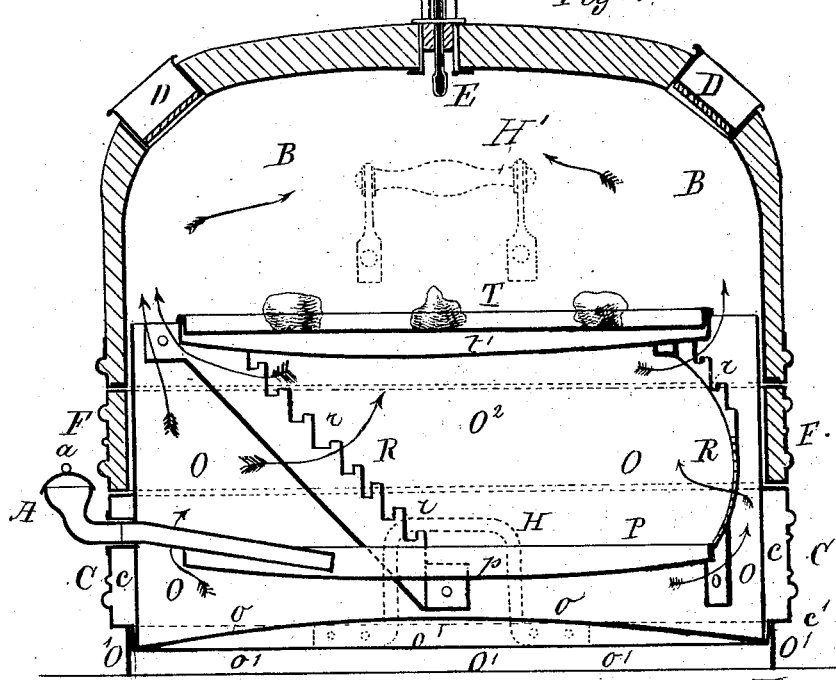
Figure 3:
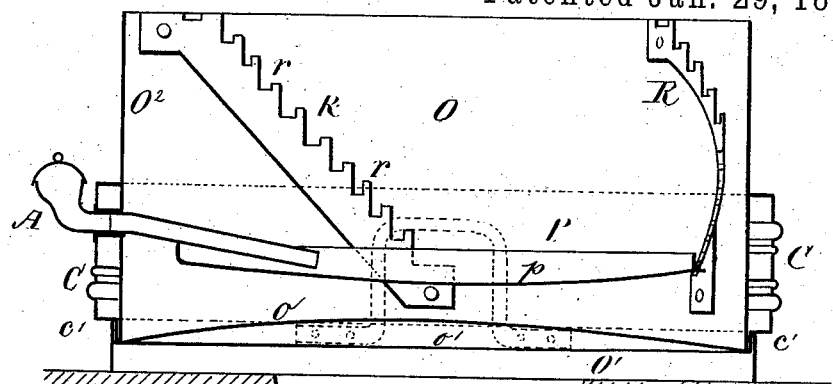
Figure 4:
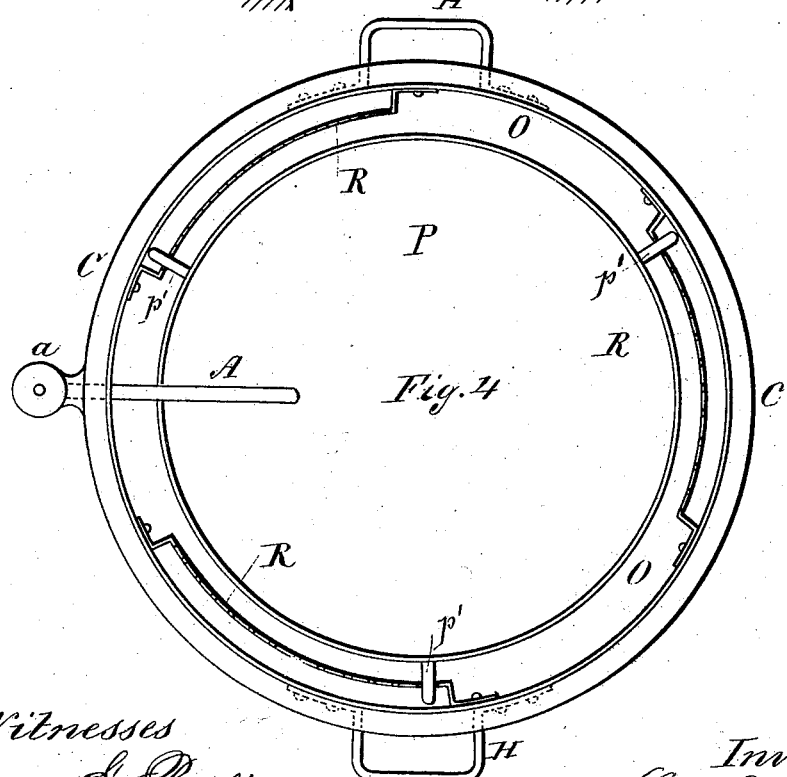

Figure 1 is a vertical transverse section of the oven embodying my improvements in its normal condition. Fig. 2 is a like view, showing the capacity of the oven increased by means of a removable section. Fig. 3 is also a vertical section of the oven, the cover being removed. Fig. 4 is a top plan view, the cover being here also removed. Fig. 5 shows in perspective one of the removable sections, by means of which the oven area is enlarged. Fig. 6 is a like view of one of the supporting-racks.

Like letters of reference indicate like parts, wherever such may occur, in the above figures of drawings.

The oven is composed of three principal parts—namely, the body of the oven, a removable cover therefor, and one or more removable oven-sections adapted to be interposed between said cover and oven-body.

O is the oven proper or oven-body, shown to be of cylindrical form, which form is preferred, though it may have any other suitable form. It is made of sheet metal, and has a concave bottom, $o$, the oven O and bottom $o$ being preferably made in one piece. The base of the oven is surrounded by a strong sheet-metal ring, O', that projects below the bottom $o$, and serves as a support for the same, and also as a means for collecting and retaining the heat from the furnace-grate or other heating medium, upon which the oven is placed, said ring O' forming, with the convex bottom, a heat-chamber, $o'$.

To the ring O', on opposite sides of the oven, are riveted handles H, (shown in dotted lines in Figs. 1 and 2, and in full lines in Fig. 4,) by means of which the oven is lifted on and off the fire, or otherwise carried about. Above the point of attachment of the ring O' to the oven-base is formed a dead-air chamber, $c$, by means of an outer sheet-metal casing, C, having a depending annular flange, $c'$, by means of which it is secured to the oven between its base and the ring O'.

To the interior periphery of the oven-body are riveted three (more or less) steps or racks, R, Figs. 1, 2, 3, 4, and 6. In the latter figure one of said racks is plainly shown in perspective and on an enlarged scale, by means of which racks one or more pans, T, that support the material to be cooked, roasted, or baked may be held at different elevations within the oven, said trays being provided with hooks or ears $t$, that fit the steps $r$ of the racks, and serve to support such trays. The said racks also serve to support one or more heat-deflecting or distributing plates or pans P, provided with a number of ears or hooks, $p'$, equal to the number of racks R, by means of which the said pans are hooked to the steps $r$ of such racks, as shown in Fig. 4. The pans P T are of such a diameter relatively to the inner diameter of the oven as to leave a passage all around them for the proper circulation of the heat. The heat distributing and deflecting pans are preferably constructed with a concave bottom, $p$—that is to say, a bottom sloping from the periphery to the center—to better deflect the heat toward the inner walls of the oven, whereby such heat is more uniformly distributed throughout such oven. The trays T may also have a concave bottom, to form cavities in the center thereof for the collection of the juices of meats, from which such juices may be more readily taken up for basting such meat. The pans T may also be provided with a depending annular flange, t', to form a recess below the bottom of the pan for the better collection of the heat.

A is a pipe, through which steam may be admitted to the oven when desired, either for purposes of roasting, to compensate for any evaporation, or for purposes of steam-cooking. The pipe is so arranged as to project the jet of steam upon the plate P, by which it is deflected and distributed over the oven, such pipe being connected with any suitable source of steam-supply, and when not used is or may be closed by a suitable plug or by a cap, a. The plate or plates and pan or pans are or may be provided with suitable handles or other suitable means for lifting them in and out of the oven, or for adjusting the pan therein vertically and relatively to the plate P.

B is the cover, constructed of sheet metal, and provided with double walls b, filled with any suitable non-conducting material; or the said cover B may be covered with such material. It is further provided with two or more peep-holes, D, having glass or mica plates, whereby I provide a means for inspecting the process of baking, roasting, or cooking without opening the oven. The cover B is further provided with a thermometer, E, to enable the attendant to note the degree of heat within the oven, and also with handles H', as shown in dotted lines, Figs. 1 and 2.

In practice I prefer to make the oven itself vertically adjustable—that is to say, I construct the same of two or more sections fitting one upon another. One of these sections is shown in perspective, Fig. 5, and consists of a double-walled cylinder containing a non-conducting material in the chamber formed by its walls. As shown in the drawings, the oven-section extends some distance into the cover B, so that one or more of the removable sections F may be passed over the oven-extension or throat O², formed above the casing C. The number of sections adapted to be applied will depend upon the height of this throat, which may be extended as far into the cover as practicable. In Fig. 2 I have shown the oven-area increased by the interposition of a removable section, F, between the cover B and the dead-air-chamber casing C.

By means of the construction of oven above described I am enabled not only to utilize all the heat conveyed thereto, but to regulate the same by means of the adjustable plate or plates and pan or pans, and to uniformly distribute the heat throughout the oven. The heat radiated from the bottom o of the oven is deflected and uniformly distributed throughout the oven. If the distance between the plate P and pan T is diminished, the heat above the latter is increased, as a greater amount of such heat will pass above the pan, the reverse taking place when the distance between them is increased, as a larger amount of heat will then pass under the pan T, as will be readily understood. The plate or plates P, as well as the pan or pans T, may also be constructed in the form of dead-air chambers—that is to say, they may be composed of two pans—one within the other, the outer pan being of such depth relatively to the inner pan as to form a dead-air chamber between their respective bottoms.

Having thus described my invention, what I claim is—

1. An extensible portable oven composed of the body of the oven, a cover for the same, and one or more sections adapted to be interposed between the cover and body of the oven and form an air-tight structure, substantially as and for the purposes specified.

2. An extensible portable oven composed of the body of the oven, a cover therefor, and one or more sections adapted to be interposed between the body and cover and form an air-tight and non-radiating structure, substantially as described, for the purposes specified.

3. In a portable oven, the combination, with the body of the oven, provided with an exterior flange or seat for a cover, racks to support the material treated, and a cover, of one or more removable sections adapted to be interposed between said oven and its cover, said parts having their walls provided with a suitable non-conductor of heat, and constructed to form a practically air-tight structure, substantially as and for the purposes specified.

4. In a portable oven, the combination, with the oven proper, provided with racks R, of a pan for supporting the material treated, and a heat-deflecting plate, both adjustable vertically upon the racks of a cover, and one or more removable sections adapted to be interposed between said cover and the oven, substantially as and for the purposes specified.

5. In a portable oven, the combination, with the oven proper, a removable cover therefor, and the support for the material treated, of a heat-deflecting plate adjustable toward and from said support between it and the source of heat, substantially as and for the purposes specified.

6. In a portable oven, the combination of a cover provided on its surface with a coating of a non-conducting material, with the oven O, provided with an exterior dead-air chamber constructed to form a seat for said cover, substantially as described.

7. In a portable oven, the oven-body O and the removable cover B thereof, said oven-body having an exterior dead-air chamber constituting the seat for said cover, in combination with a deflecting-plate, P, arranged within the oven, a steam-pipe to inject steam upon said plate, and a pan, T, said parts being arranged for co-operation, substantially as and for the purposes specified.

8. In a portable oven, the combination of the oven proper, O, having a dead-air chamber constructed to form the seat for the cover, a double-walled cover, B, filled with a non-conducting material, having peep-holes D, and a thermometer, E, and means, substantially such as described, for supporting a pan or pans, all arranged for co-operation, substantially as described, for the purposes specified.

9. The combination, with the oven O B, provided with supporting-racks, of a pan and a heat-deflecting plate adjustable vertically within the oven, and having flanges projecting beyond their bottoms to form heat-collecting recesses, substantially as described, for the purposes set forth.

In testimony that I claim the foregoing I have hereunto set my hand this 1st day of July, 1882.

LEON DATHIS.

Witnesses:
E. P. MACLEAN,
G. MARATRAY.